United States Patent [19]

Benedetti

[11] Patent Number: 4,918,799

[45] Date of Patent: Apr. 24, 1990

[54] METHOD AND APPARATUS FOR FORMING STRINGERS FOR FREE-STANDING CIRCULAR STAIRCASES

[76] Inventor: Louis Benedetti, 10 Continental Ave., Forest Hills, N.Y. 11375

[21] Appl. No.: 335,992

[22] Filed: Apr. 10, 1989

[51] Int. Cl.[5] .......................... B23Q 3/00; B27H 1/00

[52] U.S. Cl. ........................................ 29/467; 52/187; 144/256.2; 144/344; 144/345; 144/349; 156/443; 269/904

[58] Field of Search .......................... 26/464, 466, 467; 144/2 R, 355, 256.1, 256.2, 344, 345, 346, 349; 269/904; 156/189, 222, 443; 52/187

[56] References Cited

FOREIGN PATENT DOCUMENTS 1728013 11/1975 Fed. Rep. of Germany ...... 144/349

*Primary Examiner*—W. Donald Bray

*Attorney, Agent, or Firm*—Marius J. Jason

[57] ABSTRACT

A structure on which stringers for a free-standing circular staircase are formed in accordance with a time-saving method is disclosed. The structure comprises upper and lower metal patterns connected by vertical beams. The patterns have a plurality of rays attached to a central hub. The beams are attached to equidistant rays at a given distance from the center of the respective pattern. Clamps are affixed at successively higher positions along the perimeter of the circle formed by the beams that hold the stringer while it is being laminated with epoxy resin, until it has become rigid.

Separate sets of beams may be used to form inner and outer stringers for a staircase, or the outer stringer may be formed on the same set of beams after the inner stringer has become rigid.

8 Claims, 4 Drawing Sheets

METHOD AND APPARATUS FOR FORMING STRINGERS FOR FREE-STANDING CIRCULAR STAIRCASES

BACKGROUND OF THE INVENTION

1. Field of the Invention

The present invention relates to methods and apparatus for the construction of supports for staircase treads. More particularly, the present invention provides a form for the construction of curved stringers and banisters for staircases.

2. Discussion of Related Art

Axially-mounted helical jigs for forming the stringers that support treads on a curved staircase are well-known, as shown in U.S. Pat. No. 3,879,026. In this disclosure, the stringers are formed on radial clamp arms that are pivotably mounted on a central pipe. The pipe is suspended horizontally between two bearings that hold the arms above the floor.

The rotational position of the arms about the pipe is then carefully adjusted so that the arms form a sequence of equal angles about the pipe. The proper rotational adjustment of the arms is determined using a plumb bob and protractor. The position of the arms along the pipe and the stringer clamps along the length of the radial clamp arms must also be individually adjusted to accommodate the desired radius.

These multiple adjustments of the helical jig are time consuming, but critically important to the appearance of the completed staircase. Furthermore, this jig forms only one of the curved staircase elements at a time.

In contrast, the helical jig disclosed in U.S. Pat. No. 3,902,948 does not require assembly by highly skilled workmen, because it connects horizontal braces between posts on the radial arts of the jig to assure correct positioning of the parts of the jig. However the addition of these posts and braces, and their attendant brackets and fasteners, greatly increases the amount of time required to assemble this jig. Furthermore, this jig also only forms one of the curved staircase elements at a time.

SUMMARY OF THE INVENTION

The method and apparatus in accordance with the present invention provides means for quickly assembling a structure on which stringers for a curved staircase can be formed. The structure is assembled by connecting beams between corresponding points on congruent upper and lower radial patterns. Each pattern has a plurality of connection points. The beams are connected between the patterns so as to be substantially perpendicular to said patterns. Support means are then attached to the beams at a height that increases from beam to beam, for each consecutive beam.

To form a circular staircase, the beams are connected to points located at a given radius from the center of each pattern. The selected points to which beams are connected in each pattern are selected so that the radii on which consecutive selected points are located define equal angles between them. The support clamps for the stringers are then attached to the vertical beams at a height that increases from beam to beam, for each consecutive beam, by a constant amount.

BRIEF DESCRIPTION OF THE DRAWINGS

The nature and advantages of the present invention will be better understood when the detailed description of the preferred embodiment given below is considered in conjunction with the drawings, wherein.

DETAILED DESCRIPTION OF THE PREFERRED EMBODIMENT

Figure 1:
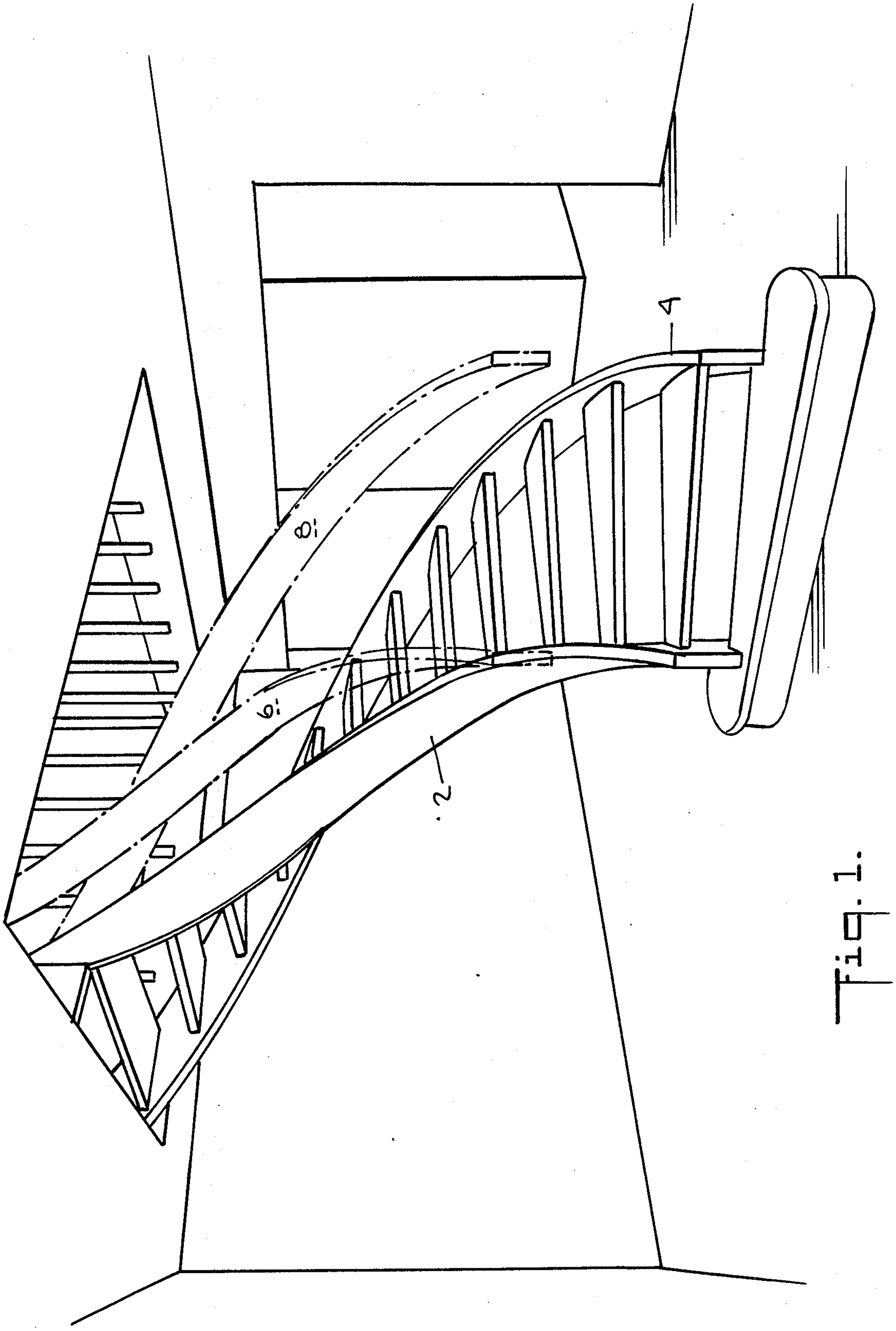
FIG. 1 is a schematic perspective view of a free-standing circular staircase.

FIG. 1 shows a free-standing circular staircase in which the risers 1 of the staircase are supported by two curved stringers 2, 4. The finished staircase will also have curved banisters 6, 8 (shown in phantom).

Figure 2:
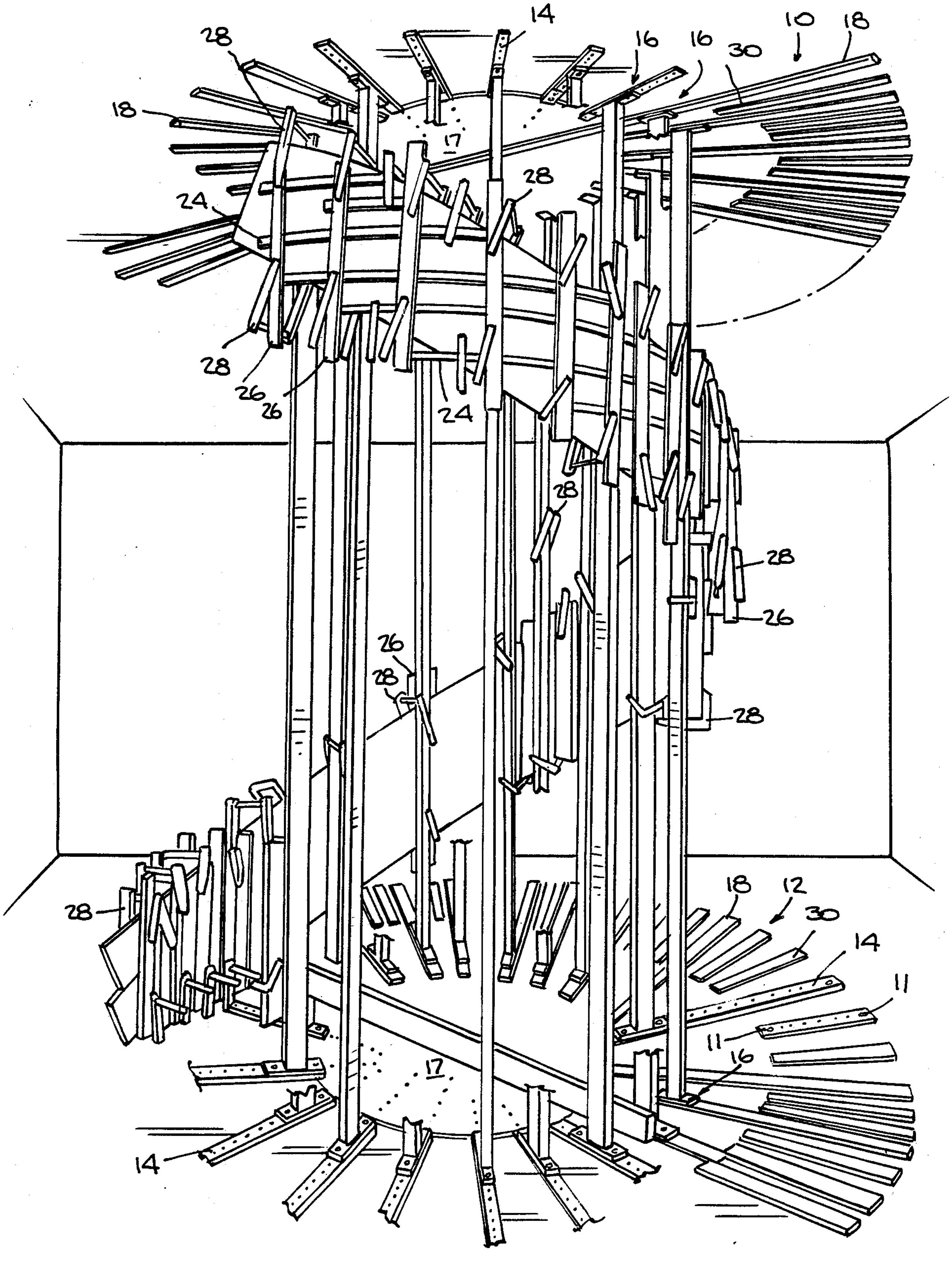
FIG. 2 is a schematic perspective view of apparatus in accordance with the present invention.

FIG. 2 shows the jig on which stringers and banisters are formed in accordance with the present invention. Several of these curved staircase elements can be formed on this jig at once, one above the other. This is particularly advantageous when both stringers of a curved staircase have the same radius.

In FIG. 2 a first perforated radial metal pattern 10 is attached to the ceiling in a woodworking workshop by screws 11. Similarly, a second, congruent perforated metal pattern 12 is attached to the floor of the workshop. The patterns are located so that the perforations 14 in the second pattern 12 lie directly below corresponding perforations 14 in the first pattern 10.

Figure 3:
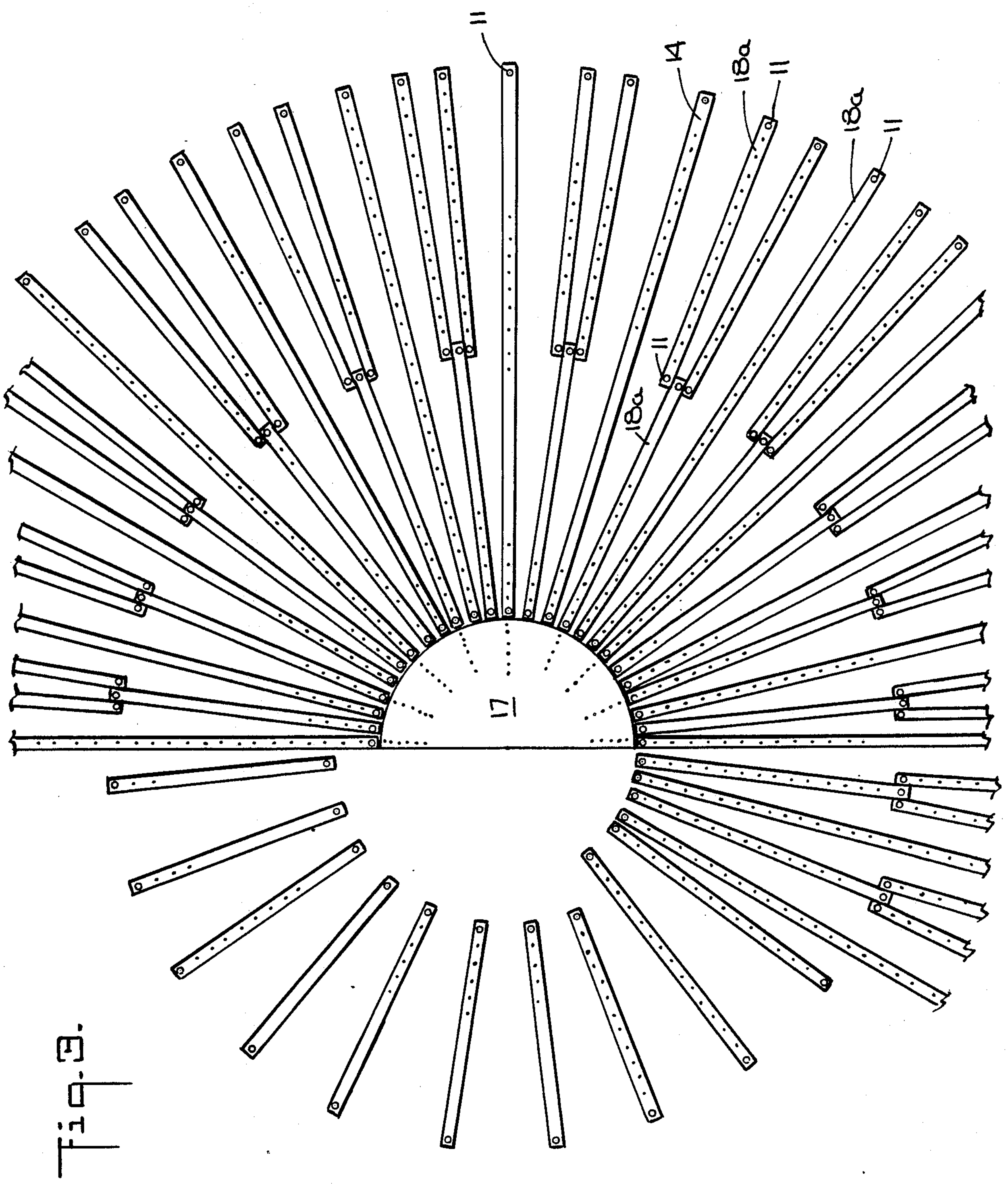
FIG. 3 is a plan view of a pattern in accordance with the presently preferred embodiment of the invention.
Figure 4:
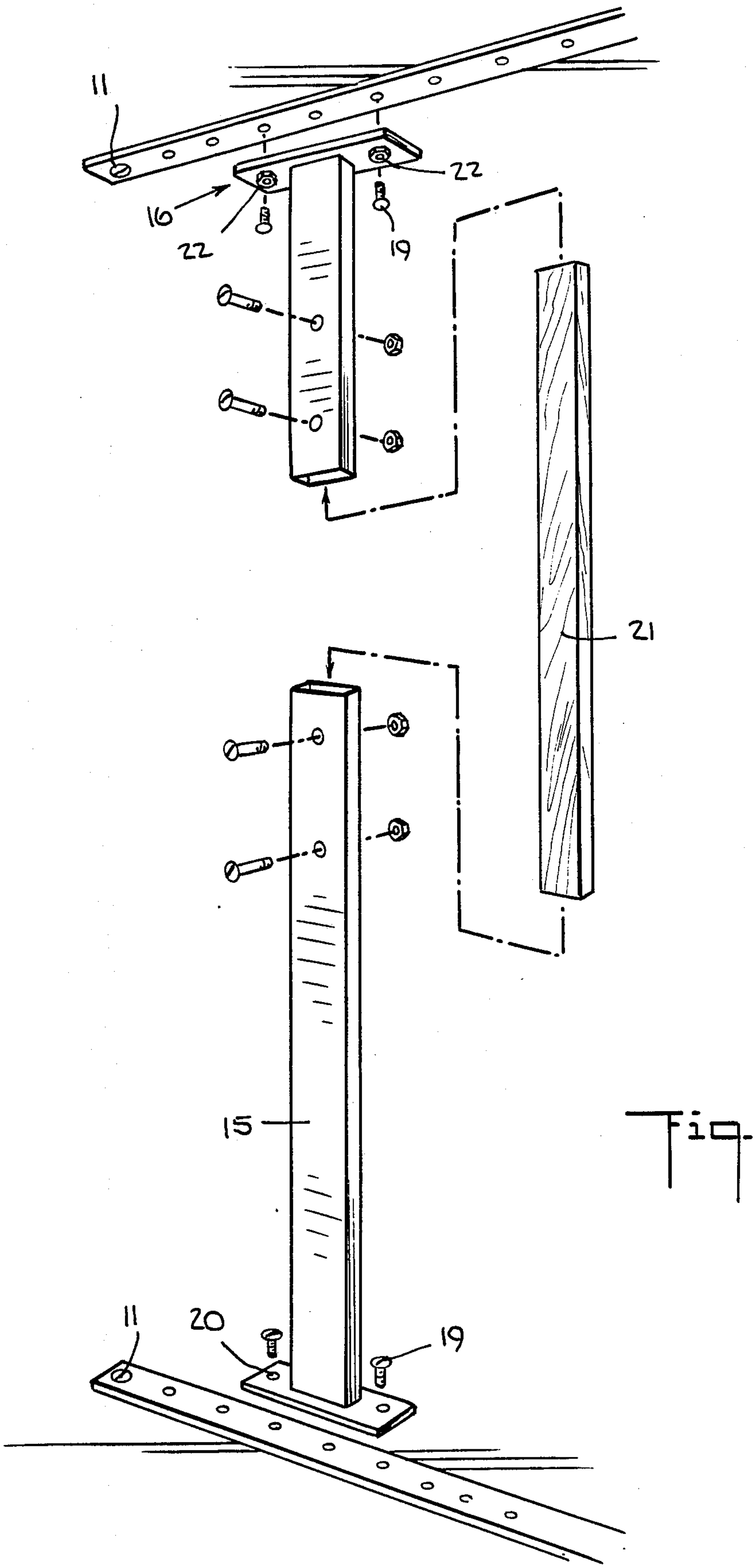
FIG. 4 is a perspective view of the bracket attached to the upper end of a beam in accordance with a presently preferred embodiment of the invention.

In FIG. 2 the two patterns are connected by vertical metal beams 15 having metal brackets 16 welded to each end of the beam. (In FIG. 2, alternate beams have been cut away and details related to them have been omitted to simplify the drawing.) The metal patterns 10, 12 each have a hub area 17 surrounded by a plurality of rays 18, which are metal strips. FIG. 3 shows an alternative pattern of rays **18*a*. Each ray 18 of the metal patterns 10, 12 has a line of perforations 14 extending along its longitudinal axis. The perforations 14 in each line are spaced so as to receive fasteners 19 inserted through the holes 20 drilled through the flat surfaces of the metal end plates 16 that are welded to each end of the beam 15** and extend outward from each side of the beam, as shown in FIG. 4.

In the presently preferred embodiment, the parts of the two patterns 10, 12 are attached directly to the workshop floor and ceiling, in the interest of simplicity. However, the beams 15 include an adjustable extension 21, to permit their use elsewhere.

Also, the fasteners 19 for the beams 15 are bolts. Two retainer nuts 22 are welded to the end plate 16 at the end of the beam that is adapted to be attached to the pattern 10 on the ceiling of the workshop, as shown in FIG. 4. These retainer nuts 22 hold the bolts 19 that attach the beam 15 to the ceiling pattern 10, when the beam is moved. This is particularly convenient in that staircase elements having different curvatures can be formed by merely moving the same beams to different predetermined locations indicated on the patterns.

Alternatively, the patterns 10, 12 can be mounted on spacers so as to provide clearance between the patterns and the floor and ceiling, respectively, for the insertion of snap-lock fasteners. The use of snap-lock fasteners can reduce the time needed for the installation and removal of the beams 15. However, the pattern must be more rigid if the beams 15 are attached to it and not attached to the ceiling.

In accordance with a presently preferred embodiment, each of the stringers 2, 4 may be formed by fitting a single wooden structural member to the outside surfaces of the beams 15 using curved wooden battens 24. The battens are held against the stringer by vertical braces 26 that are attached to beams 15 by c-clamps 28. The shape of the stringer is then fixed in the desired curvature by curing or structural reinforcement.

Alternatively, the stringers can be formed by laminating thin sheets of wood with glue. The clamps 28 can be attached to successively higher portions of the successive beams 15 around the hubs 17 so as to support the laminated wood while the glue dries.

The inner stringer 2, if any, is preferably formed first. After the lamination of the inner stringer 2 is complete and the inner stringer 2 has been removed from the clamps, the beams 15 may then be moved outward along their respective rays 18, without changing the position of the clamps 28 along the beams 15. The beams 15 are then reattached to the patterns 10, 12 at the radius choosen for the outer stringer 4. Additional beams are added to rays 30 between the rays 18 used for forming the inner stringer 2 as needed, to prevent the distance between clamps from becoming excessive.

Alternatively, after the lamination of the inner stringer 2 is complete, additional beams may be attached to the patterns 10, 12, further out along the rays 18 to support the lamination of the outer stringer 4, before the inner stringer 2 is ready to be removed from the clamps 28.

For forming a staircase that has an internal radius of 30 inches (76.9 cm) and an external radius of 73 inches (1.87 m), and that is 122 inches (3.13 m) high from floor to ceiling, the beams are placed along a 180-degree arc. The number of beams is increased for forming the outer stringer.

Although the invention has been described with particular reference to a presently preferred embodiment thereof, the invention is defined by the appended claims. It will be apparent to one skilled in the art that variations and modifications of the invention are possible within the spirit and scope of this invention. For example, one or both of the patterns may be integrated into the workshop door or coiling, respectively. Alternatively, the patterns could be unitized and reinforced so as to permit the beams to be erected at the location where the staircase is to be installed, or to permit the beams to be assembled horizontally in a room where the beams cannot stand upright. Furthermore, the invention may be used to form other curved elements of the staircases, such as the banisters 6, 8.

I claim:

1. A method of forming stringers for a curved staircase, said method comprising the steps of:

connecting beams between corresponding points on first and second patterns so that said beams are substantially perpendicular to said patterns, said patterns having a plurality of radial lines of said points indicated thereon;

attaching portions of a stringer to respective beams, at a height that increases from beam to beam for each consecutive beam; and removing the stringer from said beams when the form of the stringer is set.

2. A method of forming stringers for a curved staircase, said method comprising the steps of:

connecting beams between corresponding points on first and second patterns so that said beams are substantially perpendicular to said patterns, said patterns having a plurality of radial lines of said points indicated thereon;

attaching means for supporting the stringers to the beams at a height that increases from beam to beam for each consecutive beam;

assembling portions of said stringer so that it is attached to and supported on the beams by said means; and removing the stringer from said means when the form of the stringer is set.

3. The method of claim 1 wherein the beams are connected between points located at a given radius from the center of the respective patterns along rays selected so that the consecutive pairs of rays to which beams are connected in each pattern define equal angles therebetween and wherein said portions of the stringers are attached to respective beams at a height that increases from beam to beam by a constant amount for each consecutive beam.

4. The method of claim 1 wherein the beams are used to form an outer stringer for a staircase by locating each beam outward along a respective radial line of points from the points connected by the beam when the inner stringer is made.

5. The method of claim 1 wherein two stringers are formed on said beams by attaching one stringer along the length of the beams above the other stringer.

6. Apparatus for forming stringers for a curved staircase, said apparatus comprising:

first and second patterns, said patterns having a plurality of radial lines of points indicated thereon;

beams adapted to connect corresponding points on said first and second patterns, said beams being adapted to extend in a substantially perpendicular direction from said patterns; and means for releasably holding a stringer, said means being adapted to hold said stringer against said beams at a height that increases from beam to beam, for each consecutive beam.

7. Apparatus for forming stringers for a curved staircase, said apparatus comprising:

first and second patterns, each of said patterns including rays adapted to be attached to respective flat surface and having a plurality of radial lines of points indicated thereon;

beams adapted to connect corresponding points on said rays, said beams being adapted to be substantially perpendicular to said patterns; and a plurality of clamps adapted to releasably hold a stringer against said beams at a height that increases from beam to beam for each consecutive beam.

8. The apparatus of claim 6 wherein said corresponding points are located at a given radius from the center of each pattern along rays selected so that the consecutive pairs of rays to which the beams are connected in each pattern define equal angles between them and the position of the stringer along said beams is located at a height that increases from beam to beam by a constant amount for each consecutive beam.

* * * * *